United States Patent [19]

Bancod

[11] Patent Number: 5,370,446
[45] Date of Patent: Dec. 6, 1994

[54] HEADREST WITH SIDE SUPPORTS

[76] Inventor: Ludovice E. Bancod, 4133 Windom Ct., Modesto, Calif. 95356-9479

[21] Appl. No.: 164,529

[22] Filed: Dec. 10, 1993

[51] Int. Cl.⁵ .............................................. A47C 7/36
[52] U.S. Cl. .................................. 297/408; 297/217; 297/220
[58] Field of Search ............ 297/220, 411.32, 411.33, 297/391, 408, 409, 115, 217, 464, 411.35, 486, 216.1, 216.12

[56] References Cited

U.S. PATENT DOCUMENTS

| | | | |
|---|---|---|---|
| 2,738,249 | 3/1956 | Teneblatt | 297/391 X |
| 2,760,788 | 8/1956 | Segall | 297/391 X |
| 3,512,605 | 5/1970 | McCorkle | 297/391 X |
| 4,205,878 | 6/1980 | Wooten | 297/464 X |
| 4,490,842 | 12/1984 | Watanabe | 297/391 X |
| 4,565,405 | 1/1986 | Mayer | 297/391 X |
| 4,707,032 | 11/1987 | Chang | 297/411.32 X |
| 4,797,934 | 1/1989 | Hufnagel | 297/220 X |
| 4,846,527 | 7/1989 | Tulien et al. | 297/411.32 X |
| 4,902,072 | 2/1990 | Chancellor, Jr. | 297/411.32 |
| 5,083,837 | 1/1992 | Roach | 297/217 X |

Primary Examiner—James R. Brittain
Assistant Examiner—Milton Nelson, Jr.
Attorney, Agent, or Firm—Michael J. Colitz, Jr.

[57] ABSTRACT

A side headrest for the upper sides of seats to constrain the head of a user comprising a chair having a generally horizontally oriented seat portion with a rear edge and having a generally vertically oriented back portion with a lower edge adjacent to the rear edge of the seat portion and an upper edge adapted to support the head of a user, the back portion having side edges extending from the lower edge to the upper edge; a short pivot shaft rotatably coupled with respect to each side edge adjacent to its upper edge; a long support shaft coupled to each pivot shaft, the pivot shaft adapted to rotate the support shaft between a lower generally horizontal orientation and a raised generally vertical orientation; limit means for limiting the rotation of each pivot shaft and support shaft; and elastomeric over the pivot shaft and support shaft for providing softness.

4 Claims, 4 Drawing Sheets

HEADREST WITH SIDE SUPPORTS

BACKGROUND OF THE INVENTION

1. Field of the Invention

The present invention relates to headrests with side supports and more particularly pertains to restraining the head of a seated person against lateral movement.

2. Description of the Prior Art

The use of seating supports is known in the prior art. More specifically, seating supports heretofore devised and utilized for the purpose of restraining undesired movements are known to consist basically of familiar, expected, and obvious structural configurations, notwithstanding the myriad of designs encompassed by the crowded prior art which has been developed for the fulfillment of countless objectives and requirements.

The prior art discloses a large number of head rests and arm rests. By way of example, U.S. Pat. No. 3,550,958 to Krein discloses a pivotable arm rest.

U.S. Pat. No. 4,307,913 to Speigelhoff discloses an arm rest movable on parallel linkages.

U.S. Pat. No. 4,621,864 to Hill and 4,807,935 to King disclose arm rests pivotable to one of a plurality of angular orientations.

U.S. Pat. No. 4,576,413 to Hatta discloses a head rest positionable between plural orientations.

In this respect, the headrest with side supports according to the present invention substantially departs from the conventional concepts and designs of the prior art, and in doing so provides an apparatus primarily developed for the purpose of restraining the head of a seated person against lateral movement.

Therefore, it can be appreciated that there exists a continuing need for a new and improved headrest with side supports which can be used for restraining the head of a seated person against lateral movement. In this regard, the present invention substantially fulfills this need.

SUMMARY OF THE INVENTION

In view of the foregoing disadvantages inherent in the known types of seating supports now present in the prior art, the present invention provides an improved headrest with side supports. As such, the general purpose of the present invention, which will be described subsequently in greater detail, is to provide a new and improved headrest with side supports and a method which has all the advantages of the prior art and none of the disadvantages.

To attain this, the present invention essentially comprises a new and improved side headrest for the upper sides of seats to constrain the head of a user comprising, in combination, a chair having a generally horizontally oriented seat portion with a rear edge and having a generally vertically oriented back portion with a lower edge adjacent to the rear edge of the seat portion and an upper edge adapted to support the head of a user, the back portion having side edges extending from the lower edge to the upper edge; a mounting bracket secured to each side edge adjacent to its upper edge; a short pivot shaft rotatably coupled with respect to each mounting bracket; a long support shaft coupled to each pivot shaft, the pivot shaft adapted to rotate the support shaft between a lower generally horizontal orientation and a raised generally vertical orientation; limit means for limiting the rotation of each pivot shaft and support shaft including a pin extending through the pivot shaft and a recess extending through an arc of about 90 degrees formed within the mounting bracket; and elastomeric means over the pivot shaft and support shaft for providing softness.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved headrest with side supports which has all the advantages of the prior art seating supports and none of the disadvantages.

It is another object of the present invention to provide a new and improved headrest with side supports which may be easily and efficiently manufactured and marketed.

It is a further object of the present invention to provide a new and improved headrest with side supports which is of a durable and reliable construction.

An even further object of the present invention is to provide a new and improved headrest with side supports which is susceptible of a low cost of manufacture with regard to both materials and labor, and which accordingly is then susceptible of low prices of sale to the consuming public, thereby making such a headrest with side supports economically available to the buying public.

Still yet another object of the present invention is to provide a new and improved headrest with side supports which provides in the apparatuses and methods of the prior art some of the advantages thereof, while simultaneously overcoming some of the disadvantages normally associated therewith.

Even still another object of the present invention is to restrain the head of a seated person against lateral movement.

Lastly, it is an object of the present invention to provide a new and improved side headrest for the upper sides of seats to constrain the head of a user comprising a chair having a generally horizontally oriented seat portion with a rear edge and having a generally vertically oriented back portion with a lower edge adjacent to the rear edge of the seat portion and an upper edge adapted to support the head of a user, the back portion having side edges extending from the lower edge to the upper edge; a short pivot shaft rotatably coupled with respect to each side edge adjacent to its upper edge; a long support shaft coupled to each pivot shaft, the pivot shaft adapted to rotate the support shaft between a lower generally horizontal orientation and a raised generally vertical orientation; limit means for limiting the rotation of each pivot shaft and support shaft; and elastomeric means over the pivot shaft and support shaft for providing softness.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
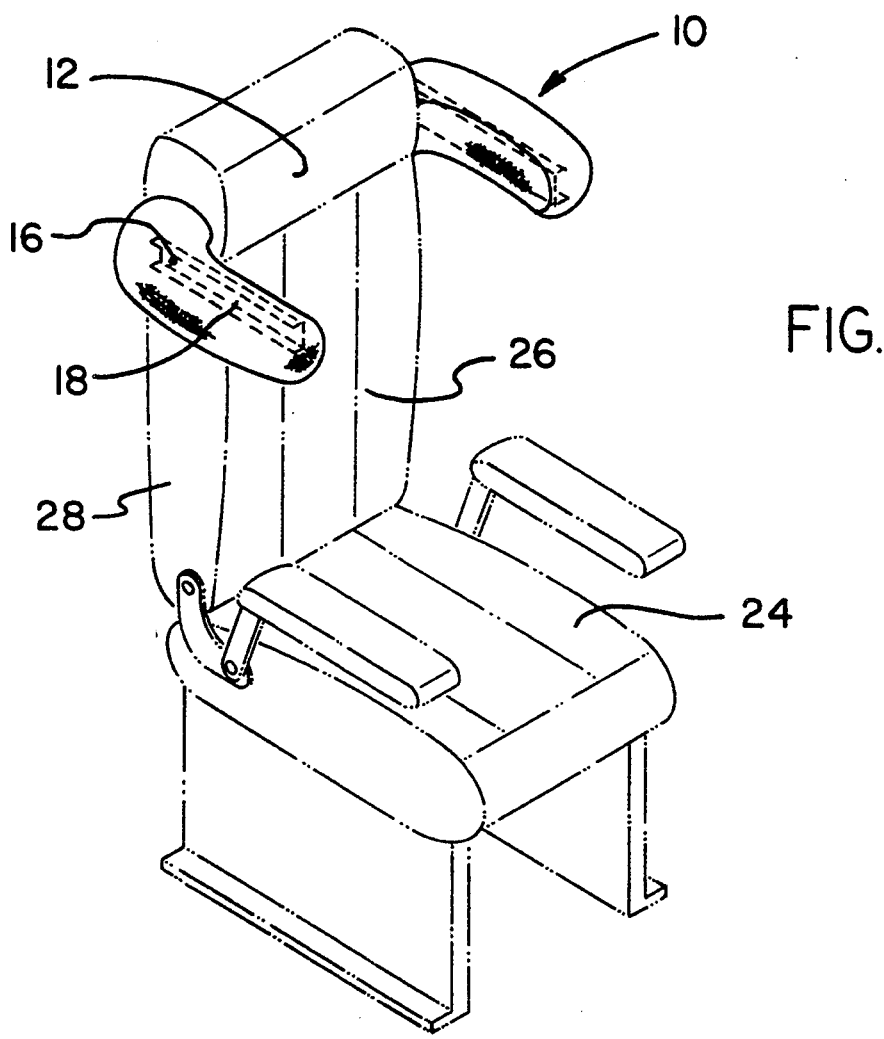
FIG. 1 is a perspective view of the headrest with side supports constructed in accordance with the principles of the present invention.

With reference now to the drawings, and in particular to FIG. 1 thereof, the preferred embodiment of the new and improved headrest with side supports embodying the principles and concepts of the present invention and generally designated by the reference numeral 10 will be described.

More specifically, the present invention includes a side headrest 10 for the upper sides of seats 12. The side headrest functions to restrain the head of a user against lateral movement. In its general configuration, the invention includes a chair 12, a pair of mounting brackets 14, a short pivot shaft 16, a long support shaft 18, rotation limiting mechanisms 20 and cushioning means 22.

The chair 12 is of a conventional construction with a generally horizontally oriented seat portion 24. The chair also includes a generally vertically oriented back portion 26. The seat portion has a rear edge while the back portion has a lower edge adjacent to the rear edge of the seat portion. The back portion also has an upper edge adapted to support the head of the user. The back portion also has side edges 28 extending from its lower edge to the upper edge.

Each side edge 28 of the chair 12 has secured thereto at its upper edge, a mounting bracket 32. Each mounting bracket is of a rigid construction and has apertures adapted to receive bolts 34. This is for mounting each bracket 32 to the chair 12. In addition, each mounting bracket is provided with a bore 36 and an arcuate recess 40.

Located within the bore 36 of each mounting bracket 32 is a short pivot shaft 16. The pivot shaft 16 is adapted for limited rotational movement within the bore 36.

Figure 2:
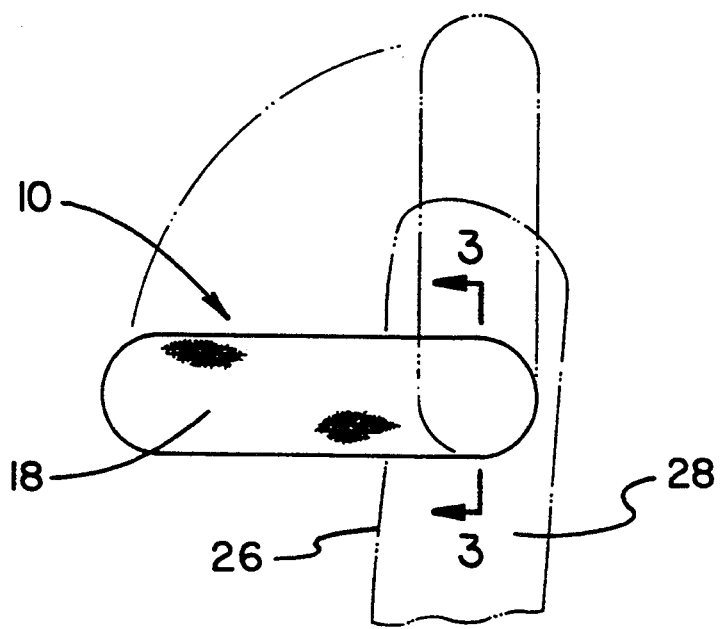
FIG. 2 is a side elevational view of the upper portion of the headrest shown in FIG. 1.
Figure 3:
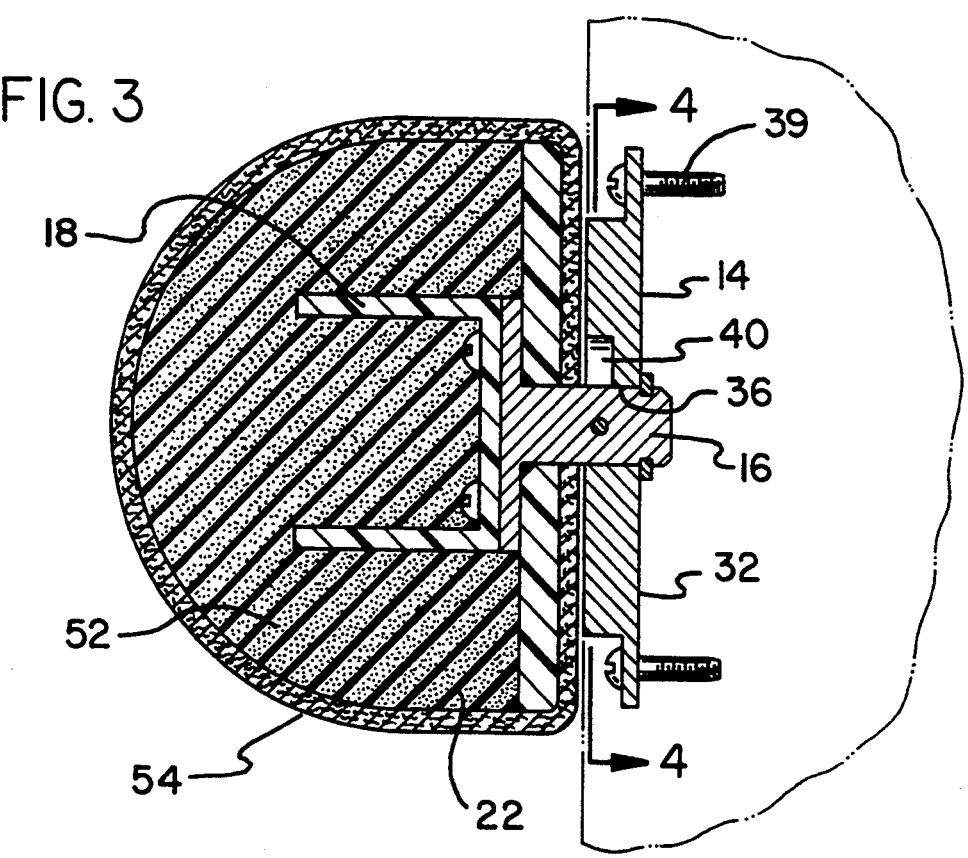
FIG. 3 is a sectional view of the headrest of the prior Figures taken along line 3—3 of FIG. 2.
Figure 4:
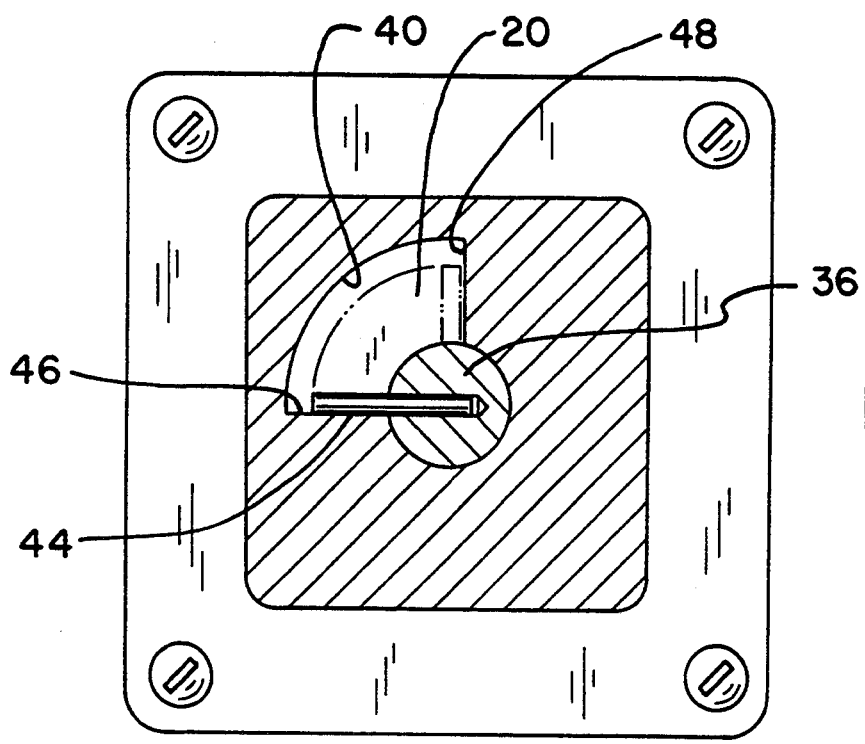
FIG. 4 is a sectional view of the headrest of the prior Figures taken along line 4—4 of FIG. 3.

Secured to the outboard end of each short pivot shaft 16 is a rigid long support shaft 18. Each support shaft 18 is of a U-shaped configuration with its central extent secured as by bolts to the outboard end of the short pivot shaft 16. The long support shaft 18 is adapted for pivotal movement between a lower generally horizontal orientation as shown in FIG. 1 to a raised generally vertical orientation as shown in dotted lines of FIG. 2.

In association with the support shaft 18 and pivot shaft 16 are rotation limiting mechanisms 20. Such mechanisms function to limit the rotation of each pivot shaft 16 and its associated support shaft 18. Such limiting mechanisms include a pin 44 extending radially from one edge of the short pivot shaft in combination with the recess 40 in the mounting bracket. The mounting bracket recess is of an arcuate configuration, extending about 90 degrees. The recess has a generally horizontal face 46 extending forwardly from the axis of the pivot shaft and a generally vertical face 48 extending upwardly from the axis of the pivot shaft. The faces are adapted to be contacted by the pin 44 to limit its rotational movement and hence, the rotational movement of the short pivot shaft and, in turn, the support shaft.

Lastly, the short pivot shaft 16 and long support shaft 18 are covered by elastomeric material 52 to provide softness or a pillow effect to the side head rests of the chair. The preferred elastomeric material is a foam rubber, silicone close cell polyurethane foam. Such material is covered by an exterior cover fabric 54 to provide wear resistance, durability and enhance the appearance to the side headrests.

Figure 5:
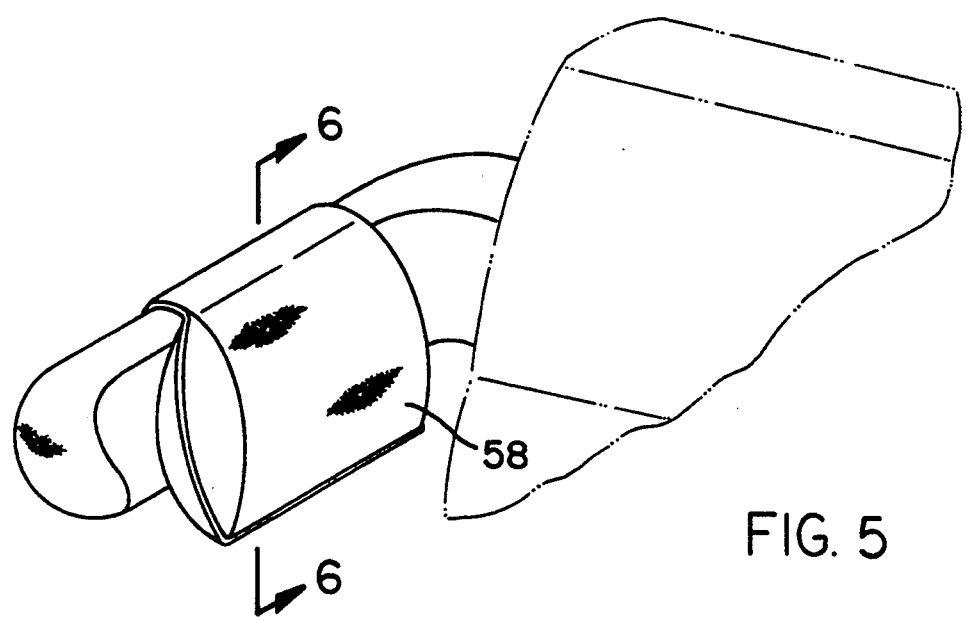
FIG. 5 is a perspective view of a headrest with side support constructed in accordance with an alternate embodiment of the invention.
Figure 6:
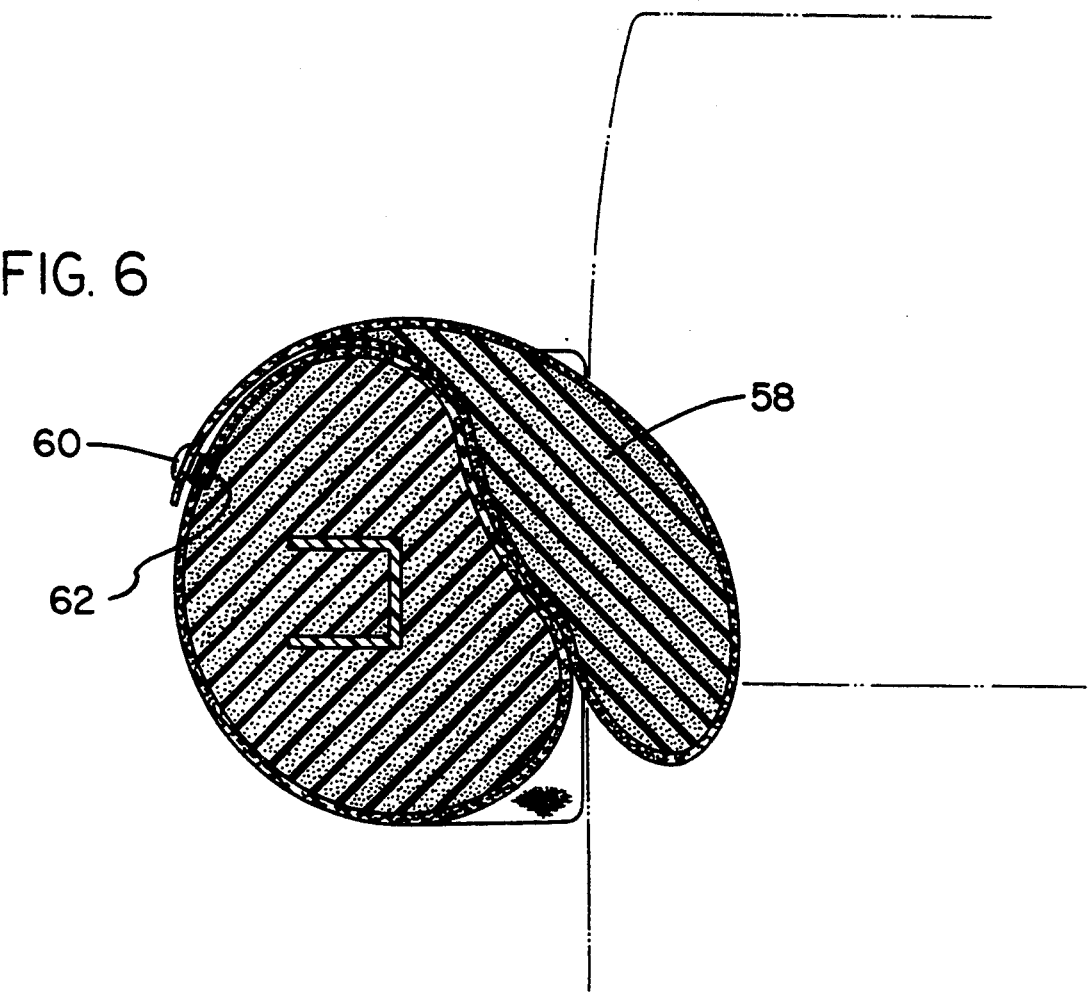
FIG. 6 is a sectional view of the headrest of the prior Figure taken along line 6—6 of FIG. 5.

As shown in the alternate embodiment of FIGS. 5 and 6, each side headrest is preferably provided with a pillow 58. Each such pillow is preferably formed in a tear drop shaped cross sectional configuration. Each such pillow is preferably fabricated of an elastomeric material with a cover fabric similar of that associated with the pivot shaft and short support shaft. Along one edge thereof, the covering material is provided with snaps 60. The snaps 60 are adapted to be releasably received by snaps 62 formed in the covering material over the long support shafts. This relationship allows for the releasable coupling between the pillow and side headrest.

Figure 7:
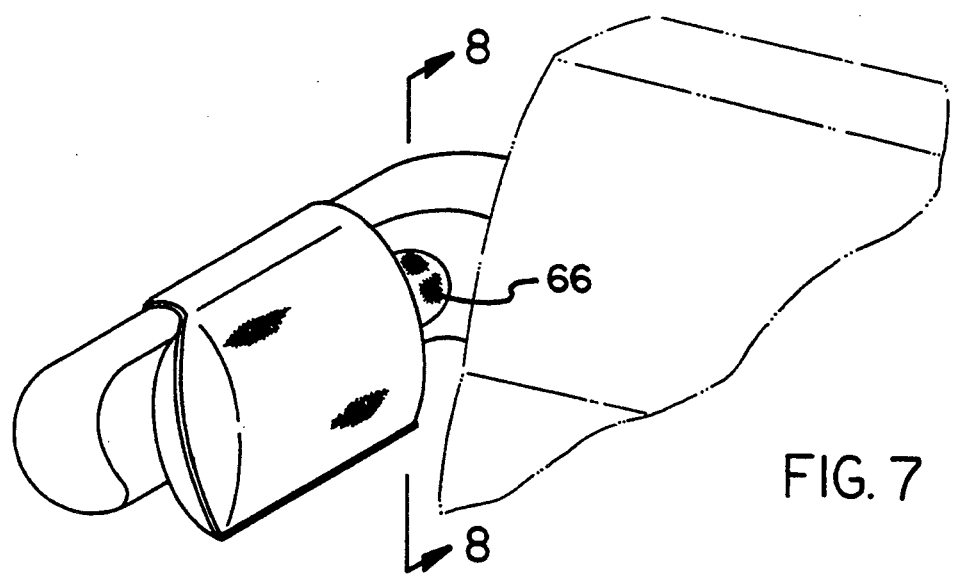
FIG. 7 is a perspective view of a headrest with side supports constructed in accordance with another alternate embodiment of the invention.
Figure 8:
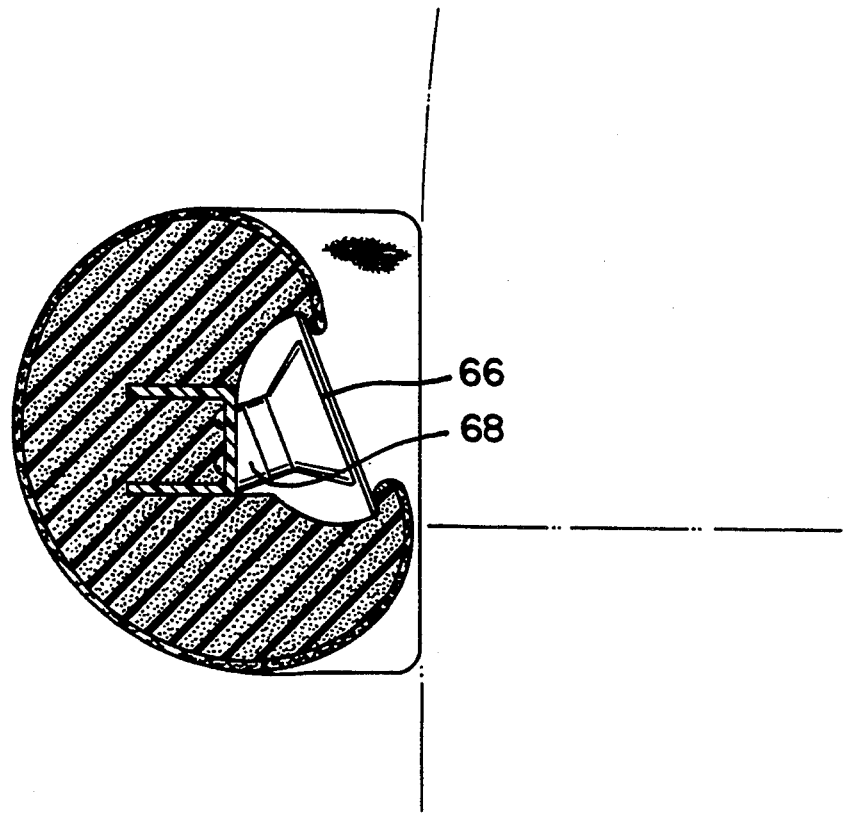
FIG. 8 is a sectional view of the headrest of the prior Figure taken along line 8—8 of FIG. 7.

Lastly, in the embodiment shown in FIGS. 7 and 8, each side headrest is preferably fabricated with a speaker 66. Each speaker has associated with it sound generation mechanisms 68 of conventional constructions. With a speaker and sound generating mechanisms located within each side headrest, preferably within its interior face, the user of the present invention may be entertained or lulled to sleep by the music or other sounds as may be selected.

Millions of people spend much time traveling in commercial and private airlines each year. Many of them travel at night and sleep on the plane. Even though the seat backs can be reclined, they do not provide good support for a person's head, resulting in a stiff neck and sore back when the person awakes. The pillows that are provided can be somewhat effective but they often fall, leaving no support. The present invention provides a much improved alternative to the current practices for supporting one's head.

The present invention is incorporated into the design of the seat. It is padded with a soft resilient silicone or foam rubber for optimal comfort. It provides an integral headrest on both sides of the seat back. The present invention is positioned vertically when not in use. The headrest can be easily rotated to the horizontal position, when the seat occupant wishes to nap or just relax. It will hold a pillow and keep it from falling out of place.

The design can also be incorporated into automobile seats, and even home furnishings. In the automotive field, it would make an ideal improvement on the captain's chairs employed in many vans and conversions. It can also be used in buses and trains. The present invention provides for more comfort for all types of travelers and passengers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved side headrest for the upper sides of seats to constrain the head of a user comprising, in combination:

a chair having a generally horizontally oriented seat portion with a rear edge and having a generally vertically oriented back portion with a lower edge adjacent to the rear edge of the seat portion and an upper edge adapted to support the head of a user, the back portion having spaced parallel side edges extending from the lower edge to the upper edge, the chair also having arm portions adjacent to each side edge of the back portion adjacent to the lower edge of the back portion;

a mounting bracket secured to each side edge of the back portion adjacent to the upper edge of the back portion;

a short pivot shaft rotatably coupled with respect to each mounting bracket;

a long support shaft coupled to each pivot shaft, the pivot shaft adapted to rotate the support shaft between a lower generally horizontal orientation and a raised generally vertical orientation;

limit means for limiting the rotation of each pivot shaft and support shaft including a pin extending through the pivot shaft and a recess extending through an arc of about 90 degrees formed within the mounting bracket; and elastomeric means over the pivot shaft and support shaft for providing softness.

2. A side headrest for the upper sides of seats to constrain the head of a user comprising:

a chair having armrests and a generally horizontally oriented seat portion with a rear edge and having a generally vertically oriented back portion with a lower edge adjacent to the rear edge of the seat portion and an upper edge adapted to support the head of a user, the back portion having side edges extending from the lower edge to the upper edge;

a short pivot shaft rotatably coupled with respect to each side edge of the back portion adjacent to the upper edge of the back portion;

a long support shaft coupled to each pivot shaft, the pivot shaft adapted to rotate the support shaft between a lower generally horizontal orientation and a raised generally vertical orientation;

limit means for limiting the rotation of each pivot shaft and support shaft; and elastomeric means over the pivot shaft and support shaft for providing softness.

3. The apparatus as set forth in claim 2 and further including a pillow with snaps positioned on the interior surface of each side headrest and associated snaps on each side headrest for the releasable coupling therebetween.

4. The apparatus as set forth in claim 2 and further including a speaker with associated sound generation mechanisms within each side headrest.

* * * * *